United States Patent Office 3,814,779
Patented June 4, 1974

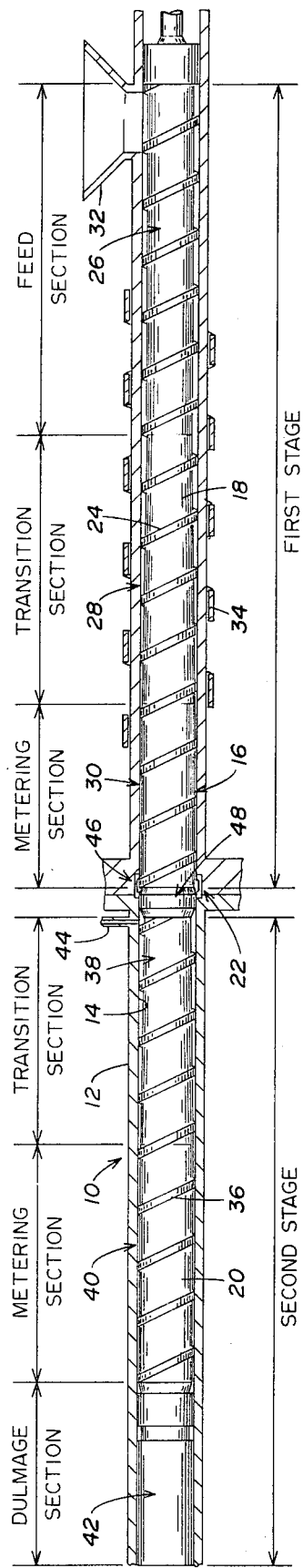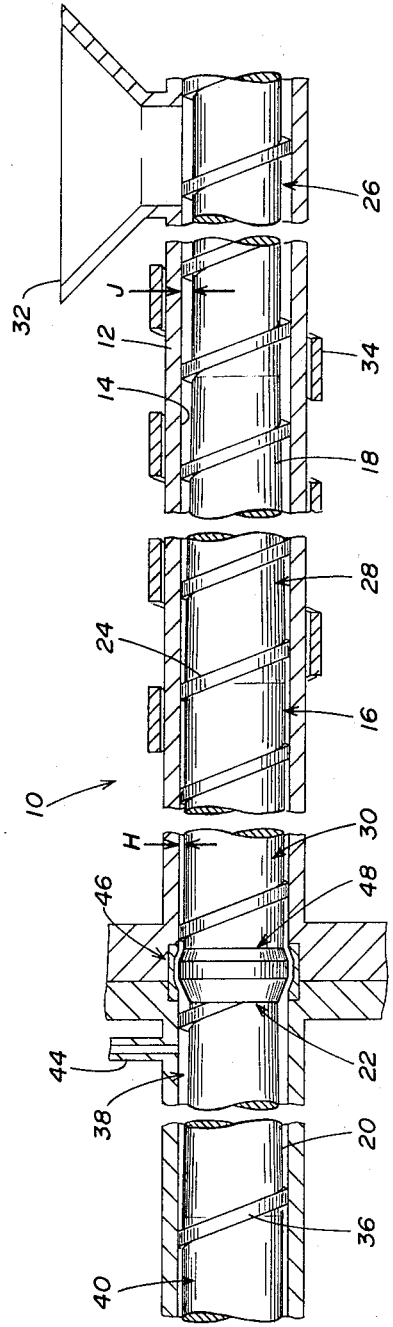

3,814,779
METHOD OF FORMING FOAMED POLYSTYRENE ARTICLES FROM POLYSTYRENE BEADS
Donald F. Wiley, Big Spring, Tex., assignor to Cosden Oil & Chemical Company, Big Spring, Tex.
Filed Apr. 1, 1971, Ser. No. 130,258
Int. Cl. B29d 27/00; B29f 3/06
U.S. Cl. 264—53                          1 Claim

ABSTRACT OF THE DISCLOSURE

A screw extruder for converting polystyrene beads into foam including an extruder screw having a first screw stage for receiving polystyrene beads and for compressing and melting the beads to form melted polystyrene and a second screw stage for receiving melted polystyrene from the first stage and for distributing a blowing agent throughout the melted polystyrene; and a ring valve for controlling the flow of melted polystyrene from the first stage to the second stage and thereby preventing backflow of the blowing agent from the second stage into the first stage. The first screw stage of the extruder screw has a compression ratio of about 3.5:1, and comprises a metering section, a transition section that is about 1.5 times as long as the metering section, and a feed section that is about 2 times as long as the metering section.

---

This invention relates to a method of using a screw extruder, and more particularly to an improved extrusion method useful in converting polystyrene beads into polystyrene foam.

Polystyrene is traditionally supplied in the form of small cylindrical pellets. In accordance with one method of processing polystyrene, these pellets are fed into an extruder which compresses and melts the pellets to form melted polystyrene, and then forces the melted polystyrene through an extruder die to form rods, tubes, sheets, and other solid polystyrene articles. Such an extruder may be characterized by its compression ratio, which in the screw extruder art means the ratio of the maximum difference between the outer diameter and the inner diameter of the screw of the extruder to the minimum difference therebetween. It is well-known that screw extruders designed to receive polystyrene pellets operate most efficiently when provided with a screw having a compression ratio of about 4:1.

At the present time, certain polystyrene production facilities employ a polymerization process that produces small spherical beads of polystyrene. Since most processing equipment is designed to receive polystyrene in pellet form, it has been the practice to convert these beads into pellets prior to further processing. This may be accomplished by feeding polystyrene beads into an extruder that forms thin rods of solid polystyrene, and then chopping the rods into pellets. It was first believed that the screw of an extruder designed to receive polystyrene beads should have a higher compression ratio than the screw of an extruder designed to receive polystyrene pellets. However, through experience, it has been determined that the best compression ratio for the screw of an extruder that is to receive polystyrene in bead form is about 3.5:1.

Polystyrene foam may be generated by melting solid polystyrene, distributing a blowing agent throughout the resulting melted, and then expanding the blowing agent to form bubbles in the polystyrene. In accordance with one prior art process, this is accomplished by melting polystyrene pellets in the first stage of a two stage screw extruder, and then mixing a fluid blowing agent, usually of the Freon type (generally flurocarbons) with the melted polystyrene in the second stage of the extruder. The first stage of such a device operates similarly to the extruder described above in connection with the production of solid polystyrene articles in that it receives and compresses and melts polystyrene pellets to form melted polystyrene. However, rather than forcing the melted polystyrene through a die, the first stage forces the melted polystyrene through a ring valve and into the second stage of the extruder. The function of the ring valve is to control the flow of melted polystyrene from the first stage to the second stage of the extruder in such a way as to prevent the backflow of blowing agent from the second stage into the first stage.

The present invention comprises the use of a screw extruder for producing polystyrene foam directly from polystyrene beads, and thereby eliminates the necessity of converting the beads to pellets. In accordance with the preferred embodiment of the invention, the extruder comprises an extruder screw having a first stage for receiving, compressing and melting polystyrene beads, and a second stage for distributing a blowing agent uniformly through the melted polystyrene. A valving mechanism is located between the stages for controlling the flow of melted polystyrene from the first stage to the second stage and thereby preventing backflow of the blowing agent into the first stage. Preferably, the screw of the extruder includes a first stage having a compression ratio of about 3.5:1 and comprising a metering section, a transition section having an axial length of about 1.5 times as long as that of the metering section, and a feed section having an axial length about 2 times as long as that of the metering section.

DESCRIPTION OF THE DRAWING

A more complete understanding of the invention may be had by referring to the following detailed description when taken in conjunction with the accompanying drawing, wherein:

FIG. 1 is a somewhat diagrammatic sectional view of a screw extruder employing the present invention, and FIG. 2 is an enlarged, fragmented view of a portion of the screw extruder shown in FIG. 1.

DETAILED DESCRIPTION

Referring now to the drawing, and particularly to FIG. 1 thereof, there is shown a screw extruder 10 incorporating the present invention. The screw extruder 10 includes a barrel 12 having a cylindrical bore 14 extending longitudinally through it, and an extruder screw 16 mounted for rotation in the bore 14 to advance polystyrene through the barrel 12. The extruder screw 16 comprises a first stage 18 which receives polystyrene beads and wherein the beads are compressed and melted to form melted polystyrene, and a second stage 20 which distributes a blowing agent uniformly throughout the melted polystyrene. The screw extruder 10 further includes a ring valve 22 which is adjusted to regulate the flow of melted polystyrene from the first stage 18 to the second stage 20 of the screw 16, and to thereby prevent backflow of the blowing agent from the second stage 20 into the first stage 18.

More particularly, the first stage 18 of the extruder screw 16 has a constant outer diameter throughout its length, and comprises a single flight 24 the various turns of which are evenly spaced. It is convenient to consider the first stage 18 as comprising three distinct sections, including a feed section 26, a transition section 28, and a metering section 30. The feed section 26 has a constant inner diameter and functions to receive polystyrene beads through a hopper 32 secured to the barrel 12 and to transport the polystyrene beads from the hopper 32 to the transition section 28. The transition section 28 has a gradually outwardly tapered inner diameter and functions to compress and melt the polystyrene beads into molten polystyrene. A resistance heater band 34 is secured around the portion of the barrel 12 enclosing the transition section 28 and is operated to heat the barrel 12, whereby melting the polystyrene beads in the transition section 28 is promoted. The metering section 30, which is also frequently referred to as the first pump, receives melted polystyrene from the transition section 28 and functions to smoothly and evenly force melted polystyrene from the first stage 18 through the ring valve 22 and into the second stage 20.

The second stage 20 of the extruder screw 16 is constructed similarly to the first stage 18 in that it has a constant outer diameter which is equal to the outer diameter of the first stage 18, and in that it comprises a single flight 36, the various turns of which are evenly spaced. The second stage 20 is conveniently considered as comprising three distinct sections, including a transition section 38, a metering section 40, and a dulmage section 42. The transition section 38 has a gradually outwardly tapered inner diameter and functions to receive melted polystyrene through the ring valve 22, to receive a fluid blowing agent through a pipe 44 and to entrain the blowing agent in the melted polystyrene. Desirably, the blowing agent employed is Freon 11, Freon 12 or mixtures thereof. The metering section 40, which is also known as the second pump, has a constant inner diameter and functions to receive the polystyrene and the Freon entrained therein from the transition section 38 and to smoothly and evenly force the melted polystyrene-entrained liquid Freon mixture into the dulmage section. The dulmage section 42 is shown diagrammatically and functions to thoroughly mix and masticate the polystyrene-entrained Freon mixture, whereby the blowing agent is uniformly distributed throughout the melted polystyrene.

The ring valve 22 of the screw extruder 10 comprises an outer member 46 secured to the barrel 12, and an inner member 48 secured between the first and second stages of the extruder screw 16. As is best shown in FIG. 2, the inner member 48 comprises cylindrical central portion having an outer diameter equal to the outer diameters of the first and second stages of the screw 16, and a pair of tapered end portions positioned on opposite sides of the central portion. The outer member 46 is shaped identically to, but is larger in diameter than the inner member 48. In accordance with the preferred embodiment of the invention, the axial position of the extruder screw 16 is adjustable within the barrel 12 between the limits illustrated in FIGS. 1 and 2. Thus, when the screw 16 is positioned as shown in FIG. 2, maximum flow of melted polystyrene through the ring valve 22 is permitted, whereas when the screw 16 is positioned as shown in FIG. 1, the flow of melted polystyrene from the first stage 18 to the second stage 20 of the screw is substantially prevented.

A very important characteristic of the screw extruder 10 comprises the compression ratio of the first stage 18 of the extruder screw 16. Referring particularly to FIG. 2, the term compression ratio is used in the screw extruder art to mean the ratio between the dimension "J" and the dimension "H," that is the ratio of the difference between the inner and outer diameters of the screw 16 in the feed section 26 to the difference between the inner and outer diameters of the screw 16 in the metering section 30. It has been determined that if the screw 16 of the screw extruder 10 is provided with a first stage compression ratio of about 3.5:1, the screw extruder will operate substantially continuously. On the other hand, if the compression ratio of the first stage of the screw 16 is raised to about 4:1, a melt-block forms in the first stage of the screw extruder after about six to eight hours of operation. When this occurs, it is necessary to clear the melt-block from the screw extruder prior to processing additional polystyrene.

It will be appreciated that the setting of the ring valve 22 also has a direct bearing on the flow of polystyrene in the first stage of the screw extruder 10. In accordance with the preferred embodiment of the invention, the first stage of the extruder screw 16 has a compression ratio of about 3.5:1, and the ring valve 22 is adjusted to prevent the backflow of blowing agent into the first stage of the extruder. By this means, the overall compression ratio between the beginning of the first stage 18 and the beginning of the second stage 20 is adjusted to between about 3.5:1 and about 4:1.

Another important characteristic of the screw extruder 10 comprises the relative axial lengths of the various sections of the first stage 18 of the extruder screw 16. Preferably, the axial length of the transition section 28 is about 1.5 times the axial length of the metering section 30, and the axial length of the feed section 26 is about 2 times the axial length of the metering section 30. These ratios may be compared with those of most prior art extruder screws, wherein the transition section is typically shorter than the metering section and the feed section is typically about 1.5 times as long as the metering section. It has been found that lengthening the transition section of the first stage of the extruder screw 16 relative to the metering section both stabilizes the feed rate of the extruder 10 and smoothes the transition of polystyrene from the solid to the liquid phase. It has been determined that when the above-described relative axial lengths of the metering, transition and feed sections of the first stage 18 of the extruder screw 16 are combined with a first stage compression ratio of about 3.5:1, approximately 20% less input power is required to operate the screw extruder 10 at the same throughput rate.

In the use of the screw extruder 10, solid polystyrene in bead form is fed into the barrel 12 through the hopper 32, and the screw 16 is rotated to advance the polystyrene through bore 14 of the barrel 12 from the feed section 26 of the first stage 18 toward the dulmage section 42 of the second stage 20. The ring valve 22 is initially adjusted in accordance with the bulk density of the polystyrene to provide maximum polystyrene flow without permitting backflow of the blowing agent from the second stage 20 to the first stage 18. However, once the valve 22 is initially adjusted, its setting remains constant so long as the bulk density of the polystyrene that is fed to the extruder remains the same.

As the polystyrene is advanced through the first stage 18 of the screw 16, it is compressed to remove air and is melted to form melted polystyrene. Melting of the solid polystyrene beads in the transition section 28 is assured by operating the resistance heater band 34 to control the temperature within the transition section. The metering section 30 of the first stage 18 receives melted polystyrene from the transition section 28 and operates to even and smooth the flow of the melted polystyrene as it is forced through the ring valve 22 into the second stage 20.

The second stage 20 receives melted polystyrene from the first stage 18, and functions to entrain blowing agent in the melted polystyrene and to thoroughly mix the blowing agent with the polystyrene. The latter function occurs in the dulmage section wherein the blowing agent and the polystyrene are thoroughly masticated and mixed to uniformly disperse the blowing agent throughout the polystyrene. Thereafter, the polystyrene-entrained blowing agent mixture is extruded from the screw extruder 10, into an area of reduced pressure, whereupon the blowing agent expands within the polystyrene to form polystyrene foam. The resulting polystyrene foam may then be processed in any desired manner, for example, the foam may be shaped into sheeting, profiles, etc.

It will be appreciated that although the preferred embodiment of the invention has been illustrated in the drawing, various modifications can be made to the basic structure. For example, either or both stages of the extruder screw can comprise multiple flights. Also, the compression in the two stages can be provided by varying the spacing between the turns of the flights rather than by, or in addition to enlarging the inner diameters thereof. Finally, it would be possible to provide a screw extruder in which the outer diameter is varied to provide the necessary compression.

Similarly, the present invention is not limited to screw extruders in which blowing agents such as Freon mixed with melted polystyrene. For example, in certain systems, other materials, particularly pentane, are mixed with melted polystyrene. Still other systems are characterized by adding blowing agents to the solid polystyrene before it is fed into the extruder, and subsequently reacting the blowing agents.

One of the most important variations that is possible in the structure of screw extruders incorporating the present invention relates to the nature and operation of the ring valve. It will be appreciated that exactly the same valving action can be achieved either by varying the axial positioning of the inner member of the valve on the extruder screw, or by varying the axial positioning of the outer member of the valve in the barrel. Also, completely different devices can be employed to accomplish valving. For example, certain prior art screw extruders have employed specially designed flights to perform the necessary valving function. Alternatively, the extruder may comprise separate first and second stages, in which case melted polystyrene may be removed from the barrel at the end of the first and returned to the second stage through a conduit. Such a design permits the valving function to be accomplished by a conventional valve mechanism located in the conduit.

From the foregoing, it will be appreciated that the present invention comprises a screw extruder for generating polystyrene foam from polystyrene beads which includes a first stage for receiving polystyrene beads and for compressing and melting the beads to form melted polystyrene, and a second stage for receiving melted polystyrene from the first stage and for uniformly distributing a blowing agent in the melted polystyrene. The first stage of the screw of the extruder preferably has a compression ratio of about 3.5:1, and comprises a metering section, a transition section that is about 1.5 times as long as the metering section, and a feed section that is about 2 times as long as the metering section. The preferred embodiment of the invention further includes a valving mechanism located between the first and second stages for preventing backflow of the blowing agent into the first stage.

Although the preferred embodiment of the invention has been illustrated in the accompanying drawing and described in the foregoing specification, it will be understood that the invention is not limited to the embodiment disclosed, but is capable of rearrangement, modification and substitution of parts and elements without departing from the spirit of the invention.

What is claimed is:

1. The method of forming a shaped foamed polystyrene article from polystyrene beads comprising transporting, heating, compressing and mechanically working the polystyrene beads in the first stage of a two stage extruder to form a melt of the polystyrene and metering the melt in the first stage to the second stage of the extruder;
the first stage having a compression ratio of about 3.5:1 and having a metering section and a transition section which is about 1.5 times as long as the feed section and a feed section which is about 2 times as long as the metering section;
forcing the resulting melted polystyrene through a ring valve at the junction of the two stages and into the second stage of the screw extruder;
admitting a volatile organic blowing agent to the second stage of the extruder at a point adjacent to the downstream side of the ring valve, mixing the liquid blowing agent with the melted polystyrene in the second stage of the screw extruder and extruding the resultant mix to form a foamed polystyrene article; and wherein
the flow of the melted polystyrene is valved from the first stage to the second stage of the screw extruder by axially displacing the extruder screw to partially close the ring valve and thereby preventing backflow of the blowing agent from the second stage into the first stage and providing an overall compression ratio between the first stage and the second stage of between about 3.5:1 and about 4.0:1 so that the throughput of the molten polystyrene and blowing agent is maximized in forming the foamed polystyrene article.

References Cited
UNITED STATES PATENTS

| | | | |
|---|---|---|---|
| 3,158,900 | 12/1964 | Heston | 259—191 |
| 3,239,882 | 3/1966 | Yokana | 259—191 |
| 3,344,215 | 9/1967 | De Witz et al. | 264—54 |
| 3,287,477 | 11/1966 | Vesilind | 264—53 |
| 3,374,300 | 3/1968 | Kimikazu Azuma | 264—53 X |
| 3,248,462 | 4/1966 | Merrill et al. | 264—53 |
| 3,618,903 | 11/1971 | Ronner | 259—5 X |
| 3,672,641 | 6/1972 | Slaby | 259—9 |
| 3,712,776 | 1/1973 | Woodham et al. | 259—191 X |
| 2,970,341 | 2/1961 | Mallory et al. | 425—812 X |
| 2,515,250 | 7/1950 | McIntire | 264—349 X |
| 2,669,751 | 2/1954 | McCurdy et al. | 264—53 |
| 3,008,184 | 11/1961 | Fritsch | 425—208 X |
| 3,026,273 | 3/1962 | Engles | 264—53 X |
| 3,115,675 | 12/1963 | Tedder | 259—191 |
| 3,263,276 | 8/1966 | Maier | 425—208 |
| 3,347,528 | 10/1967 | List et al. | 259—10 X |
| 3,451,103 | 6/1969 | Aykanian et al. | 264—53 X |
| 3,599,292 | 8/1971 | Ronzoni et al. | 425—197 X |

FOREIGN PATENTS

| | | | |
|---|---|---|---|
| 700,412 | 12/1964 | Canada | 425—208 |
| 1,040,956 | 9/1966 | Great Britain | 425—208 |
| 1,066,206 | 4/1967 | Great Britain | 425—208 |
| 1,167,007 | 4/1964 | Germany | 425—208 |

OTHER REFERENCES

Bernhardt, Ernest C., Edt. "Processing of Thermoplastic Materials," New York, Reinhold, c. 1959, pp. 228–238.

"Wire and Cable Coaters' Handbook," first edition, Wilmington, Del., E. I. du Pont de Nemours & Co., c. 1968, pp. 42–45, 57–59, 145–147.

PHILIP E. ANDERSON, Primary Examiner

U.S. Cl. X.R.

259—191; 264—176 R, DIG 5, DIG 13; 425—4 C, 208, 817 C